(12) United States Patent
Dougherty et al.

(10) Patent No.: US 9,564,751 B2
(45) Date of Patent: Feb. 7, 2017

(54) ZONE SELECTIVE INTERLOCKING AND CIRCUIT PROTECTION DEVICE MONITORING IN A POWER DISTRIBUTION SYSTEM

(71) Applicant: General Electric Company, Schenectady, NY (US)

(72) Inventors: John James Dougherty, Newtown, PA (US); Marcelo Esteban Valdes, Burlington, CT (US)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 14/541,660

(22) Filed: Nov. 14, 2014

(65) Prior Publication Data

US 2016/0141861 A1    May 19, 2016

(51) Int. Cl.
| | | |
|---|---|---|
| *H02H 3/00* | (2006.01) | |
| *H02H 7/30* | (2006.01) | |
| *H02H 7/26* | (2006.01) | |
| *H02H 3/44* | (2006.01) | |
| *H02H 3/08* | (2006.01) | |
| *H02H 9/02* | (2006.01) | |
| *H02H 3/033* | (2006.01) | |

(52) U.S. Cl.
CPC .............. *H02H 7/30* (2013.01); *H02H 7/262* (2013.01); *H02H 3/033* (2013.01); *H02H 3/08* (2013.01); *H02H 3/44* (2013.01); *H02H 9/02* (2013.01)

(58) Field of Classification Search
USPC ...................................... 361/62–69
See application file for complete search history.

(56) References Cited

U.S. PATENT DOCUMENTS

| | | |
|---|---|---|
| 5,905,616 A | 5/1999 | Lyke |
| 6,297,939 B1 | 10/2001 | Bilac et al. |
| 6,313,975 B1 | 11/2001 | Dunne et al. |
| 7,254,001 B2 | 8/2007 | Papallo et al. |
| 7,570,471 B2 | 8/2009 | Weiher et al. |

(Continued)

FOREIGN PATENT DOCUMENTS

WO    9312566 A    6/1993

OTHER PUBLICATIONS

Valdes, Marcelo E. et al., "Advances in Protective Device Interlocking for Improved Protection and Selectivity," IEEE Transaction on Industry Applications, vol. 50, No. 3, May/Jun. 2014, 10 pages.

*Primary Examiner* — Danny Nguyen
(74) *Attorney, Agent, or Firm* — General Electric Company

(57) ABSTRACT

Circuit protection devices, power distribution systems, and circuit protection device monitoring in a zone selective interlocking (ZSI) system are described. In one example, a circuit protection device for use in a ZSI power distribution system includes a trip mechanism configured to interrupt current flowing through the circuit protection device, and a trip unit operatively coupled to the trip mechanism. The trip unit is configured to monitor current flowing through the circuit protection device, output a first signal when the monitored current is less than a threshold value, and output a second signal when the monitored current is greater than or equal to the threshold value. The first and second signals are different from each other and different than an absence of a signal.

19 Claims, 4 Drawing Sheets

(56) References Cited

U.S. PATENT DOCUMENTS

| | | |
|---|---|---|
| 8,270,136 B2 | 9/2012 | Vicente et al. |
| 2008/0198521 A1* | 8/2008 | Weiher .................. H02H 7/262 361/64 |
| 2009/0257157 A1* | 10/2009 | Vicente .................. H02H 7/30 361/42 |
| 2014/0007569 A1 | 1/2014 | Gayton |

* cited by examiner

ZONE SELECTIVE INTERLOCKING AND CIRCUIT PROTECTION DEVICE MONITORING IN A POWER DISTRIBUTION SYSTEM

BACKGROUND

The present application relates generally to power distribution systems and, more particularly, to zone selective interlocking and circuit protection device monitoring in power distribution systems.

Known electrical distribution systems include a plurality of switchgear lineups including circuit breakers that are each coupled to one or more loads. The circuit breakers typically include a trip unit that controls the circuit breakers based upon sensed current flowing through the circuit breakers. More specifically, the trip unit causes current flowing through the circuit breaker to be interrupted if the current is outside of acceptable conditions.

Some known circuit breakers are programmed with one or more current thresholds (also known as "pickup" thresholds) that identify undesired current levels for the circuit breaker. If a fault draws current in excess of one or more current thresholds for a predetermined amount of time, for example, the trip unit typically activates the associated circuit breaker to stop current from flowing through the circuit breaker. However, in power distribution systems that include a plurality of circuit breakers, a typical arrangement uses a hierarchy of circuit breakers. Large circuit breakers (i.e., circuit breakers with a high current rating) are positioned closer to a power source than lower current feeder circuit breakers and feed the lower current feeder circuit breakers. Each feeder circuit breaker may feed a plurality of other circuit breakers, which connect to loads or other distribution equipment.

A fault may occur anywhere in the circuit breaker hierarchy. When a fault occurs, each circuit breaker that has the same fault current flowing through it may detect different amounts of fault current as a result of varying sensor sensitivities and/or tolerances. When the fault occurs, the circuit breaker closest to the fault should operate to stop current from flowing through the circuit breaker. If a circuit breaker higher in the hierarchy trips, multiple circuits or loads may unnecessarily lose service.

To accommodate for the varying tolerances and to ensure that multiple circuit breakers do not unnecessarily trip based on the same fault current, the current thresholds of at least some known circuit breakers are nested with each other to avoid overlapping fault current thresholds. In some other known systems, circuit breakers in a lower tier send coordination or blocking signals to higher tier circuit breakers upon detection of a fault current. The upper tier circuit breakers' operation is coordinated with the operation of the lower tier circuit breaker in response to the blocking signal. In at least some known systems, higher tier circuit breakers are unable to distinguish between the absence of a blocking signal and a communication failure (such as a broken connection/wire) between the lower tier circuit breaker and the higher tier circuit breaker. When a communication failure occurs in such systems, the higher tier circuit breaker will remain unaware that the lower tier circuit breaker has detected a fault and unnecessary nuisance trips of the higher tier circuit breaker are more likely.

BRIEF DESCRIPTION

In one aspect, a zone selective interlocking (ZSI) power distribution system includes a first circuit protection device configured to interrupt a current flowing through the first circuit protection device, a second circuit protection device downstream from the first circuit protection device, and a controller. The second circuit protection device includes a trip mechanism configured to interrupt current flowing through the second circuit protection device, and a trip unit operatively coupled to the trip mechanism. The trip unit is configured to monitor current flowing through the second circuit protection device, output a first signal when the monitored current is less than a threshold value, and output a second signal when the monitored current is greater than or equal to the threshold value. The first and second signals are different from each other and different than an absence of a signal. The controller is configured to control the first circuit protection device in a first mode in response to the first signal, control the first circuit protection device in a second mode in response to the second signal, and control the first circuit protection device in a third mode in response to the absence of a signal from the second circuit protection device.

In another aspect, a circuit protection device for use in a ZSI power distribution system includes a trip mechanism configured to interrupt current flowing through the circuit protection device, and a trip unit operatively coupled to the trip mechanism. The trip unit is configured to monitor current flowing through the circuit protection device, output a first signal when the monitored current is less than a threshold value, and output a second signal when the monitored current is greater than or equal to the threshold value. The first and second signals are different from each other and different than an absence of a signal.

In yet another aspect, a controller for use in a ZSI power distribution system includes an output configured to be communicatively coupled to a first circuit protection device, an input configured to be communicatively coupled to a second circuit protection device downstream from the first circuit protection device, a memory device, and a processor coupled to the memory device. The controller is programmed to control the first circuit protection device in a first mode in response to detecting a first signal at the input, control the first circuit protection device in a second mode in response to detecting a second signal at the input, and control the first circuit protection device in a third mode in response to failing to detect the first signal or the second signal at the input within a determined period of time.

Another aspect is a ZSI power distribution system including a first circuit protection device configured to interrupt a current flowing through the first circuit protection device, a second circuit protection device downstream from the first circuit protection device, and a controller communicatively coupled to the second circuit protection device. The second circuit protection device includes a trip mechanism configured to interrupt current flowing through the second circuit protection device, and a trip unit operatively coupled to the trip mechanism. The trip unit is configured to monitor current flowing through the second circuit protection device, and output a first signal when the monitored current is less than a ZSI blocking threshold value. The controller is configured to control the first circuit protection device in an unrestrained operation mode in response to detecting the first signal, and control the first circuit protection device in a restrained operation mode in response to failing to detect the first signal.

DETAILED DESCRIPTION

Exemplary embodiments of circuit protection devices, zone selective interlocking (ZSI) power distribution systems, and methods of monitoring circuit protection devices and/or power distribution systems are described herein. The example systems monitor the health of the communication channel(s) between circuit protection devices in a ZSI system. The systems are operable to detect when communication has failed, generate an alert, and/or operate the higher tier circuit protection device accordingly. Moreover, example systems provide selective ZSI to permit the ZSI scheme to be configured to increase reliability and responsiveness or to reduce nuisance tripping of higher tier circuit protection devices.

Figure 1:
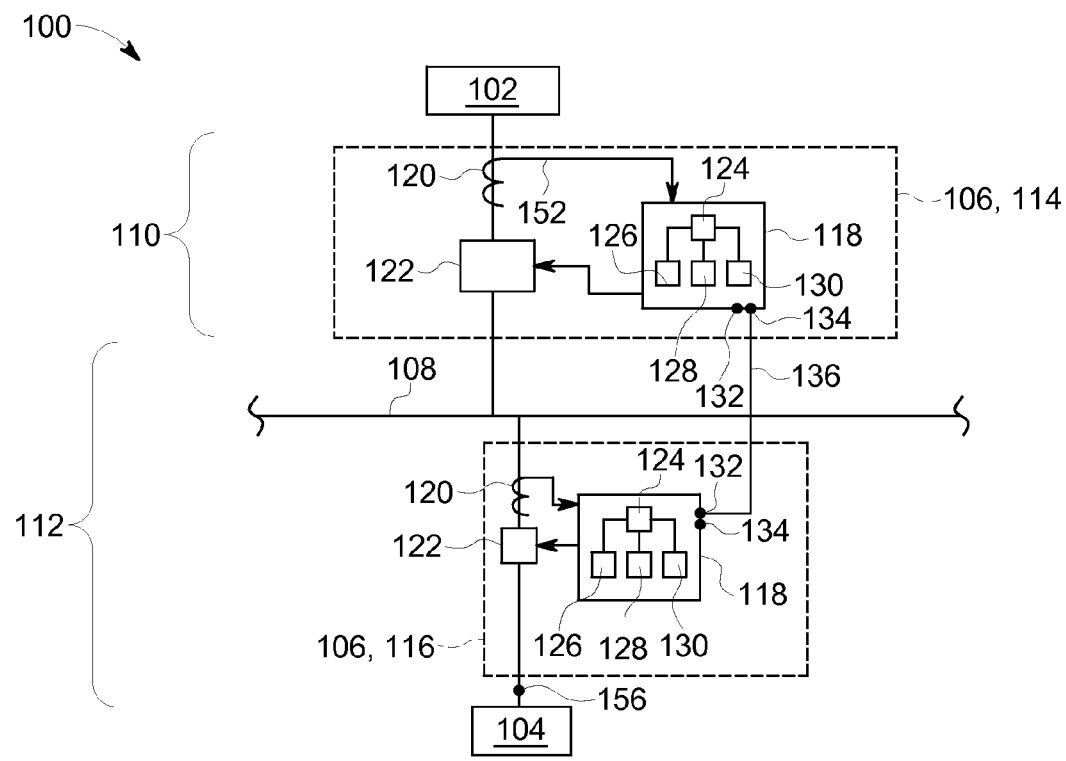
FIG. 1 is a schematic block diagram of an exemplary power distribution system.

FIG. 1 is a schematic block diagram of a portion of an exemplary power distribution system 100 including a source 102 providing power to a load 104 via circuit protection devices 106. Electrical power source 102 may include, for example, one or more generators or other devices that provide electrical current (and resulting electrical power) to load 104. The electrical current is transmitted to loads 104 through distribution bus 108. Load 104 may include, but is not limited to only including, machinery, motors, lighting, and/or other electrical and mechanical equipment of a manufacturing or power generation or distribution facility. Power distribution system 100 is a low voltage distribution system that is rated to operate at alternating current (AC) voltages up to about 1 kilovolt (kV). In other embodiments, power distribution system 100 is a medium voltage system rated to operate at AC voltages between about 1 kV and about 52 kV. Alternatively, system 100 is rated to operate at any suitable voltage or range of voltages.

In the illustrated embodiment, circuit protection devices 106 are arranged in a hierarchy including a first tier 110 and a second tier 112 to provide different levels of protection and monitoring to power distribution system 100. For example, a first circuit protection device 114 (sometimes referred to as a source circuit protection device) is arranged in first tier 110 to receive current from a first electrical power source 102 and provide current to bus 108. A second circuit protection device 116 (sometimes referred to as a feeder circuit protections device) is arranged in the second tier 112 downstream of first circuit protection device 114 and connected to receive current from bus 108. Second circuit protection device 116 provides current to load 104. As used herein, the term "downstream" refers to a direction from electrical power source 102 towards load 104. The term "upstream" refers to a direction opposite the downstream direction, for example, from load 104 towards electrical power source 102. While FIG. 1 illustrates circuit protection devices 106 arranged in two tiers 110 and 112, it should be recognized that any suitable number of circuit protection devices 106 may be arranged in any suitable number of tiers to enable power distribution system 100 to function as described herein. For example, it should be recognized that one or more additional tiers and/or circuit protection devices 106 may be disposed between electrical power source 102 and first tier 110 in some embodiments. Additionally or alternatively, one or more additional tiers and/or circuit protection devices 106 may be disposed between load 104 and second tier 112 circuit protection devices 106 in some embodiments. Moreover, one or more additional circuit protection devices 106 may be disposed to provide power (from any suitable source 102) to bus 108. Similarly, one or more additional circuit protection devices may be connected to bus 108 to provide power to one or more additional loads 104.

In the exemplary embodiment, circuit protection devices 106 are circuit breakers. Alternatively, circuit protection devices 106 may be any other device that enables power distribution system 100 to function as described herein. In an exemplary embodiment, each circuit protection device 106 is an integrated trip unit including a controller configured to control operation of circuit protection device 106. Alternatively, one or more of circuit protection devices 106 may be non-integrated circuit protection devices 106 with separate components and/or controller(s). Circuit protection devices 106 include a trip unit 118 operatively coupled to a sensor 120 and a trip mechanism 122. Trip unit 118 is a controller configured to control operation of circuit protection device 106. Trip unit 118, in an exemplary embodiment, is an electronic trip unit (ETU) that includes a processor 124 coupled to a memory 126, an input device 128, and a display device 130. Trip unit 118 may include, or may be considered to be, a computing device. In other embodiments, trip units 118 may be any other suitable type of trip unit. In some embodiments, one or more of circuit protection devices 106 include a different type of trip unit 118 and/or is a different type of circuit protection device than at least one other of circuit protection devices 106. In some embodiments, circuit protection devices 106 do not include trip units 118, and the functions described herein as being performed by trip unit 118 are instead performed by a central controller (not shown).

Sensor 120, in an exemplary embodiment, is a current sensor, such as a current transformer, a Rogowski coil, a Hall-effect sensor, and/or a shunt that measures a current flowing through trip mechanism 122 and/or circuit protection device 106. Alternatively, sensor 120 may include any other sensor that enables power distribution system 100 to function as described herein. Moreover, sensor 120 may be integrated in a circuit protection device 106 or may be separate from an associated circuit protection device 106. Different sensors 120 may be used for different portions of system 100. For example, sensors 120 in first tier 110 may be different than sensors 120 in second tier 112. Each sensor 120 generates a signal representative of the measured or detected current (hereinafter referred to as "current signal") flowing through an associated trip mechanism 122 and/or circuit protection device 106. In addition, each sensor 120 transmits the current signal to processor 124 associated with, or coupled to, trip mechanism 122. Each processor 124 is programmed to activate trip mechanism 122 to interrupt a current provided to a load 104 or an electrical distribution line or bus 108 if the current signal, and/or the current represented by the current signal, exceeds a current threshold.

Circuit protection devices 106 are communicatively coupled to each other. More particularly, circuit protection devices 106 are communicatively coupled to at least one upstream circuit protection device. In the example embodiment, circuit protection devices 106 are communicatively coupled together via communication ports in their respective trip units 118. Each trip unit 118 includes an output port 132

(also referred to as an output) and an input port 134 (also referred to as an input) configured to transmit signals to and receive signals from, other trip units 118. Each trip unit's ports 132 and 134 may be physically separate ports or may be a single physical port providing one or more virtual ports (e.g., ports 132 and 134). Port 132 or 134 of a trip unit 118 is coupled to port 134 or 132 of another trip unit 118 by one or more conductors 136. Although a single conductor 136 is shown connecting output port 132 of second circuit protection device 114 to input port 134 of first circuit protection device 114, any suitable number of conductors 136 may be used to couple ports 132 and 136. Moreover, in some embodiments, ports 134 and 136 communicate using a wireless communication protocol without use of any conductor 136. In some embodiments ports 132 and/or 134 are bidirectional (e.g., input/output) ports.

In the example embodiment, trip mechanism 122 is a circuit breaker. An electric signal is provided to trip mechanism 122 to cause the circuit breaker to trip and interrupt the flow of current through trip mechanism 122. In other embodiments, trip mechanism 122 includes, for example, one or more other circuit breaker devices and/or arc containment devices. Exemplary circuit breaker devices include, for example, circuit switches, contact arms, and/or circuit interrupters that interrupt current flowing through the circuit breaker device to a load 104 coupled to the circuit breaker device. An exemplary arc containment device includes, for example, a containment assembly, a plurality of electrodes, a plasma gun, and a trigger circuit that causes the plasma gun to emit ablative plasma into a gap between the electrodes in order to divert energy into the containment assembly from an arc or other electrical fault that is detected on the circuit.

Each processor 124 controls the operation of a circuit protection device 106 and gathers measured operating condition data, such as data representative of a current measurement (also referred to herein as "current data"), from a sensor 120 associated with a trip mechanism 122 coupled to processor 124. Processor 124 stores the current data in a memory 126 coupled to processor 124. It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 126 stores program code and instructions, executable by processor 124, to control circuit protection device 106. Memory 126 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 126. Memory 126 may also be, or include, a detachable or removable memory, including, but not limited to, a suitable cartridge, disk, CD ROM, DVD or USB memory.

Input device 128 receives input from, for example, a user, another trip unit 118, a remote computing device, etc. Input device 128 may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, a keypad, a communications port, one or more buttons, and/or an audio input interface. A single component, such as a touch screen, may function as both display device 130 and input device 128. In some embodiments, input device 128 may include a communication interface to receive input from a remote computing device (including from another trip unit 118). Although a single input device 128 is shown, a trip unit 118 may include more than one input device 128 or no input device 128.

Display device 130 visually presents information about circuit protection device 106 and/or trip mechanism 122. Display devices 144 may include a vacuum fluorescent display (VFD), one or more light-emitting diodes (LEDs), liquid crystal displays (LCDs), cathode ray tubes (CRT), plasma displays, and/or any suitable visual output device capable of visually conveying information to a user. For example, processor 124 may activate one or more components of display device 130 to indicate that circuit protection device 106 and/or trip mechanism 122 is active and/or operating normally, is receiving a blocking signal, is transmitting a blocking signal, that a fault or failure has occurred, and/or any other status of trip mechanism 122 and/or circuit protection device 106. In some embodiments, display device 130 presents a graphical user interface (GUI) to a user for interaction between the user and circuit protection device 106. The GUI permits the user, for example, to control circuit protection device 106, monitor operation/status of circuit protection device 106, test operation of circuit protection device 106, and/or modify operational parameters of circuit protection device 106.

The example system 100 is zone selective interlocking (ZSI) system. In general, downstream circuit protection devices 106 output, via output port 132, a blocking signal to upstream circuit protection devices 106 when the amount of current detected by the downstream circuit protection device 106 exceeds a blocking threshold. The blocking threshold is typically less than the tripping threshold at which the downstream circuit protection device 106 trips. In response to receiving a blocking signal, the upstream circuit protection device 106 may shift from an unrestrained mode of operation to a restrained mode of operation, to prevent the upstream and downstream circuit protection devices 106 from operating at similar trip timing sequences. Additionally or alternatively, the upstream circuit protection device 106 may switch to operating at, or using, a higher trip threshold, such as switching from a protective threshold to a backup threshold, in response to receiving a blocking signal from a downstream circuit protection device 106.

In some embodiments, in the unrestrained mode of operation, an unrestrained trip timing sequence may be executed that includes accumulating time values in which the current exceeds the protective threshold until an unrestrained time threshold is reached. In the restrained mode of operation, a restrained trip timing sequence may be executed that includes accumulating time values in which the current exceeds the backup threshold until a restrained time threshold is reached. If the restrained time threshold or the unrestrained time threshold is reached, trip unit 118 generates trip signal. Alternatively, the unrestrained trip timing sequence and the restrained trip timing sequence may include any other actions or responses that enable trip units 118 to function as described herein. It should be recognized that the unrestrained trip timing sequence causes a trip signal to be generated in a period of time that is shorter than a period of time in which the restrained trip timing sequence causes a trip signal to be generated.

In the example embodiment, the downstream circuit protection device 106, e.g. second circuit protection device 116, is configured to output a first signal when the monitored current through second circuit protection device 106 is less than a threshold value, such as a ZSI blocking threshold. In response to the first signal, the upstream first circuit protection device 114 knows that second circuit protection device 116 is functioning and does not detect a current exceeding the threshold value. In response, trip unit 118 controls operation of first circuit protection device 114 in a first mode. In the example embodiment, the first mode is an unrestrained operating mode in a ZSI scheme.

Figure 2:
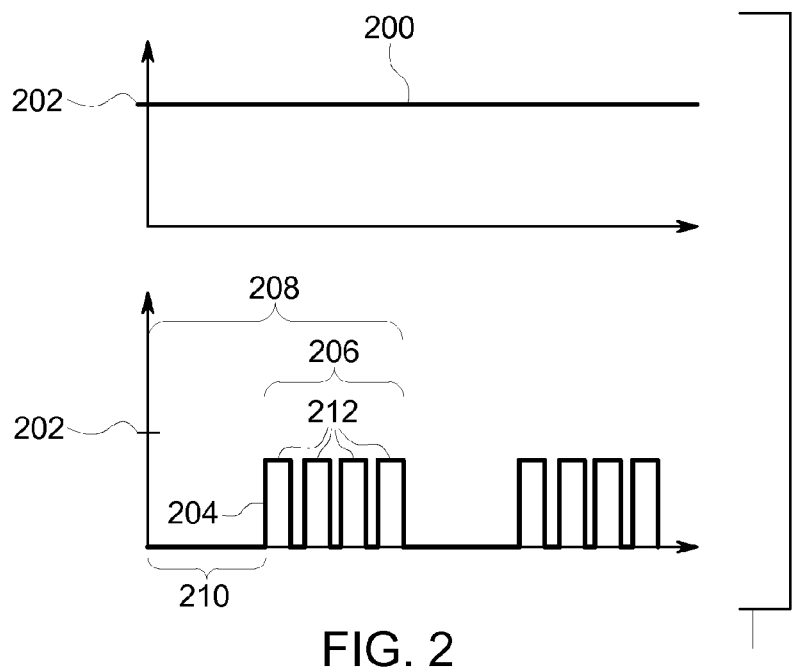
FIG. 2 is a graph of example continuous and intermittent signals.

The first signal may be a substantially continuous signal, an intermittent signal, or a data signal according to any suitable communications protocol. A shown in FIG. 2, a substantially continuous signal 200 is held a determined value 202 (e.g., positive five volts, negative two volts, ground, etc.) continuously. An intermittent signal 204 includes a signal portion 206 that repeats at a substantially constant interval/period 208 and includes a portion 210 without a signal. In the illustrated example, signal portion 206 is a series of pulses 212. In other embodiments, the signal portion may be a single pulse, more or fewer pulses, or any other suitable signal portion that may be detected by the receiving circuit protection device 206. In an example embodiment, circuit protection devices 106 communicate using active low communication, and the first signal is output from second circuit protection device 116 by pulling output port 132 down to ground.

With reference again to FIG. 1, the downstream circuit protection device 106, e.g. second circuit protection device 116, is configured to output a second signal that is different than the first signal when the monitored current through second circuit protection device 106 is equal to or greater than the ZSI blocking threshold. In response to the second signal, the upstream first circuit protection device 114 believes that second circuit protection device 116 has detected a current exceeding the ZSI blocking threshold and is handling the potential fault. The first circuit protection device 114 then operates in a second mode as configured under the particular ZSI system implemented (e.g., switches to a restrained mode of operation).

In an embodiment, the second signal is the same as the absence of a signal. First circuit protection device 114 detects the second signal by failing to detect any signal, whether the first signal or any other signal) at its input port 134. In some embodiments, first circuit protection device 114 detects the absence of a signal by failing to detect any signal on its input port 134 for a period of time. The period of time may be any suitable length of time, such as a period greater than the period of an intermittent first signal. In this example embodiment, a communication failure (such as a broken conductor 136, a failed output port 132, etc.) between second circuit protection device 116 and first circuit protection device 114 is identified by the upstream first circuit protection device 114 the same as the second signal. Thus, communication failures result in first circuit protection device 114 operating according to its ZSI scheme in the same manner (e.g., in a restrained mode) as it would if a fault had been detected by the downstream second circuit protection device 116, thereby reducing nuisance trips when a communications failure occurs. In other embodiments, the first signal is the same as the absence of a signal and a communication failure between second circuit protection device 116 and first circuit protection device 114 is identified by the upstream first circuit protection device 114 the same as the first signal. Thus, communication failures result in first circuit protection device 114 operating according to its ZSI scheme in the same manner (e.g., in an unrestrained mode) as it would if no fault was detected by the downstream second circuit protection device 116.

In other embodiments, the second signal is different than the absence of a signal and different than the first signal. The second signal may be a substantially continuous signal, an intermittent signal, or a data signal according to any suitable communications protocol. In an example embodiment, one of the first and second signals is a continuous signal and the other is an intermittent signal. In other embodiments, the first and second signals are different intermittent signals. In all such embodiments, the ZSI aspects of system 100 are a three state logical system. The signal received by the first circuit protection device 114 from the second circuit protection device 116 may be a first signal/state indicating that the second circuit protection device 116 has not detected a current exceeding the ZSI blocking threshold, a second signal/state indicating that the second circuit protection device 116 has detected a current exceeding the ZSI blocking threshold, and a third signal/state (i.e. the absence of the first or second signals) indicating a communication failure between first and second circuit protection devices 114 and 116. In response to detecting the first signal, the first circuit protection device's trip unit 118 controls first circuit protection device 114 in a first mode (e.g., an unrestrained mode). First circuit protection device 114 is controlled by its trip unit 118 in a second mode (e.g., a restrained mode) in response to detecting the second signal. When the third signal is detected (i.e., when neither the first nor the second signal is detected), trip unit 118 controls first circuit protection device 114 in a third mode. In some embodiments, the third mode is the same as one of the first mode or the second mode. In some embodiments, the third mode is selectable, such as by a user, between the first mode, the second mode, or a different mode. Accordingly, first circuit protection device' handling of a communication failure may be selectively configured as desired for a particular system. For example, in systems in which nuisance trips are highly disruptive, the third mode may be configured to be the same as the second mode. Thus, if a communications failure occurs, trip unit 118 will operate first circuit protection device 114 in the restrained operation mode of the second mode. Similarly, if nuisance trips are not a concern or higher levels of protection are desired, the third mode may be configured to be the same as the first mode, thereby allowing first circuit protection device 114 to be operated in the unrestrained first mode.

In the three state embodiments, trip unit 118 may also be configured to generate an alert in response to detecting the third signal. The alert may be a human recognizable alert, such as an audible or visual alert, and/or a computer recognizable alert. The generated alert may be a local alert, e.g. an audible or visual alert generated at the location of or on first circuit protection device 114. Additionally, or alternatively, the generated alert may be a remote alert, such as an audible or visual alert produced in a location remote from first circuit protection device, an alert transmitted to a remote computing device, etc.

Figure 3:
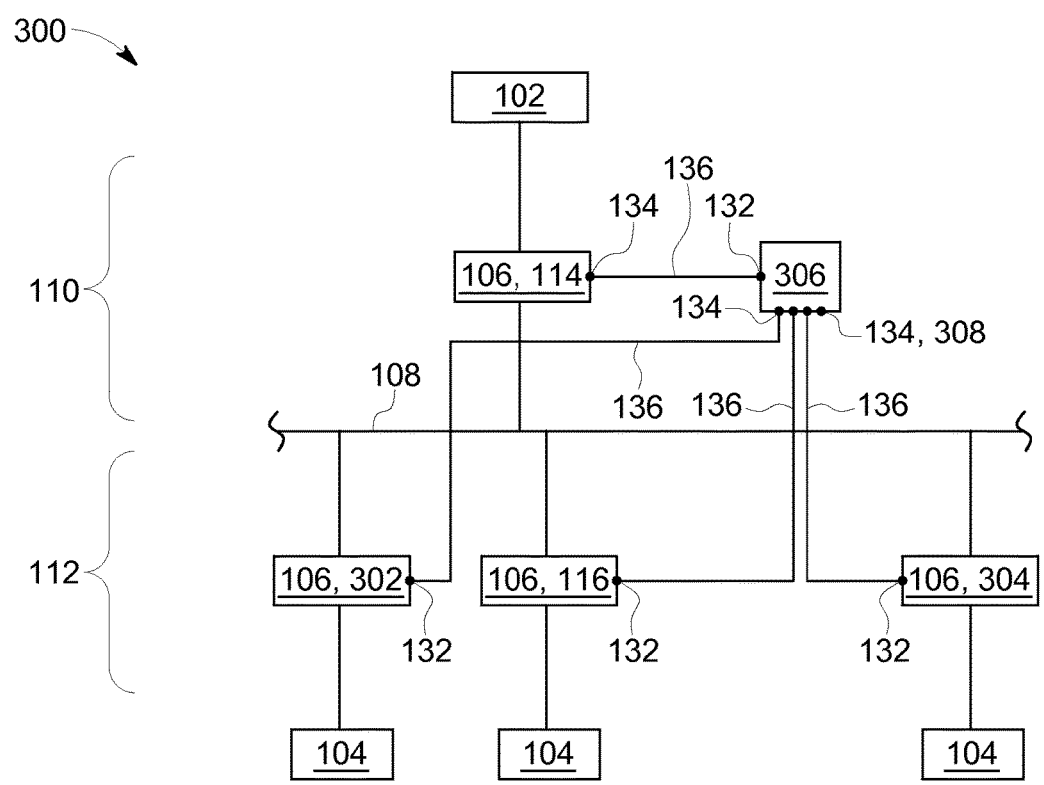
FIG. 3 is a schematic block diagram of another exemplary power distribution system.

FIG. 3 is a schematic block diagram of a portion of another exemplary power distribution system 300. Except as described herein, system 300 is the same as system 100 (shown in FIG. 1) and common components are identified by the same reference numbers. Some details of circuit protection devices 106, such as trip units 118, sensor 120, and trip mechanisms 122, are omitted from FIG. 3 for clarity.

In the example embodiment, system 300 includes first circuit protection device 114 in first tier 110. First circuit protection device 114 couples power from source 102 to bus 108. Three circuit protection devices 106 in second tier 112 are coupled to bus 108 to deliver power from bus 108 to loads 104. Other embodiments may include more or fewer tiers and/or more or fewer circuit protection device 106 in one or more tiers. The circuit protection devices 106 in second tier 112 include second circuit protection device 116, a third circuit protection device 302, and a fourth circuit protection device 304. The output ports 132 of second tier 112 circuit protection devices are coupled to input ports 134 of an aggregator 306 via conductors 136.

Each of the second, third, and fourth circuit protection devices 116, 302, and 304 outputs, via output ports 132 a first signal when current flowing through its trip unit (not shown in FIG. 3) is less than a ZSI blocking threshold, and outputs a second signal when the measured current equals or exceeds the ZSI blocking threshold.

Figure 4:
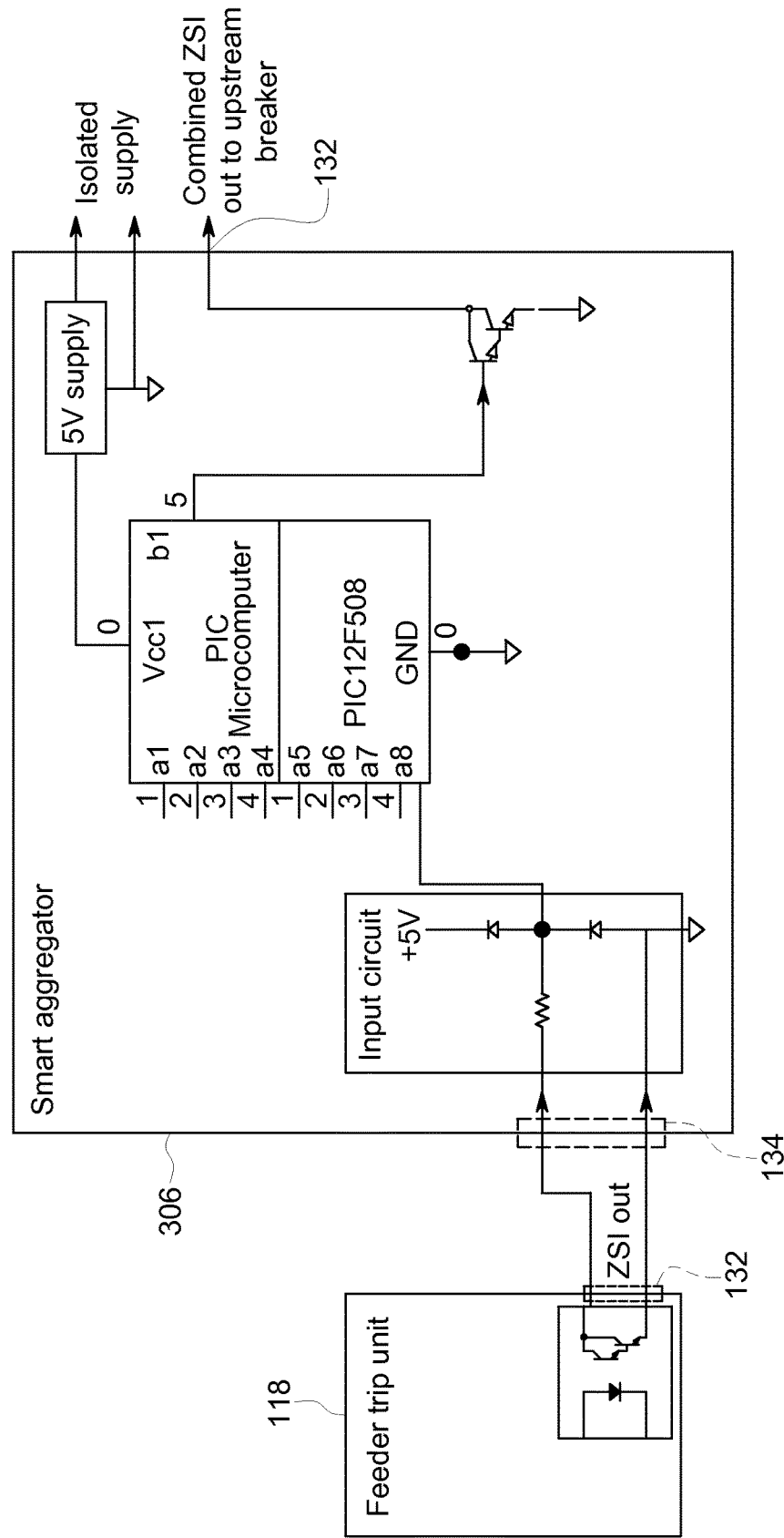
FIG. 4 is a diagram of an example aggregator that may be used in the system shown in FIG. 3.

The output signals from second, third, and fourth circuit protection devices 116, 302, and 304 are coupled to an aggregator 306. Aggregator 306 receives the signal from second tier 112 circuit protection devices and provides an aggregated output, via its output port 132, to the controller of first circuit protection device 114. More specifically, aggregator 306 provides an aggregated output to trip unit 118 (not shown in FIG. 3) of first circuit protection device 114. FIG. 4 is an example aggregator 306 capable of receiving active low inputs from eight circuit protection devices 106 that may be used in the system 300.

Referring again to FIG. 3, in the three state systems described above, the aggregated output is one of the first signal, the second signal, or the third signal (i.e., no signal), depending on the combination of inputs received by aggregator 306. If any of the inputs to aggregator 306 from the second tier 112 circuit protection devices 106 is the second signal (indicating a detected current greater than the ZSI blocking threshold), aggregator 306 outputs the second signal to first circuit protection device 114. If none of the inputs to aggregator 306 is the second signal and all of the inputs are the first signal (indicating all detected currents are below the ZSI blocking threshold), aggregator 306 outputs the first signal to first circuit protection device 114. If none of the inputs to aggregator 306 is the second signal and any input is the third signal (i.e., the lack absence of a signal), aggregator 306 outputs the third signal to first circuit protection device 114. First circuit protection device 114 operates in response to the signal from aggregator 306 in the same manner as it responded to the output signals from second circuit protection device in the example embodiments described above with respect to FIG. 1. Moreover, because aggregator 306 provides the same signals to first circuit protection device 114, first circuit protection device 114 may be identical to the first circuit protection device 114 in system 100 and does not need to know that it is receiving signals from an aggregator rather than from a circuit protection device 106.

In the illustrated embodiment, aggregator 306 has four input ports 134. Other embodiments include more or fewer input ports. In some implementations, not all of the aggregator's input ports 134 will be used or needed. Each port may be switched on or off, by electrical, mechanical, or electromechanical switches, to indicate to aggregator 306 that the port is unused. The illustrated embodiment includes one unused port 308. Because unused port 308 is not connected to a circuit protection device 106, it will never receive a signal. To prevent aggregator 306 from incorrectly interpreting this absence of a signal as the third signal, unused port 308 is switched off.

Figure 5:
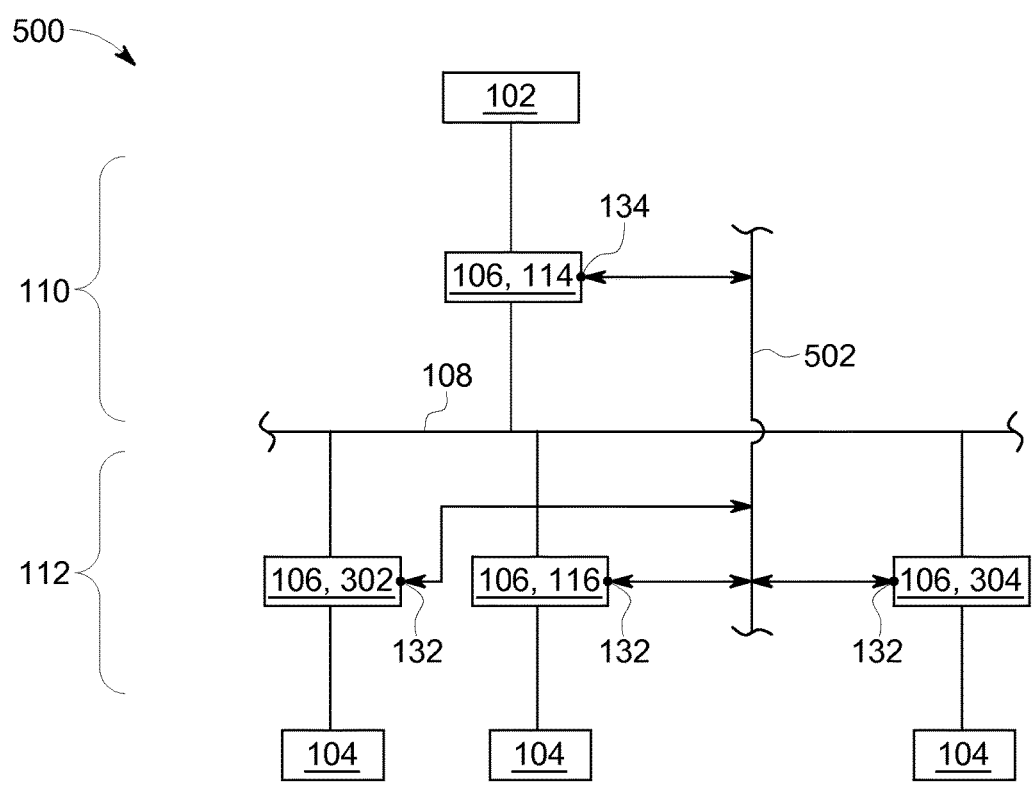
FIG. 5 is a schematic block diagram of an exemplary power distribution system including a communication bus.

FIG. 5 is a schematic block diagram of a portion of another exemplary power distribution system 500. Except as described herein, system 500 is the same as systems 100 (shown in FIG. 1) and 300 (shown in FIG. 3) and common components are identified by the same reference numbers. Some details of circuit protection devices 106, such as trip units 118, sensor 120, and trip mechanisms 122, are omitted from FIG. 5 for clarity.

In the example embodiment, system 500 includes first circuit protection device 114 in first tier 110. First circuit protection device 114 couples power from source 102 to bus 108. Second circuit protection device 116, third circuit protection device 302, and fourth circuit protection device 304 are located in second tier 112 are coupled to bus 108 to deliver power from bus 108 to loads 104. Other embodiments may include more or fewer tiers and/or more or fewer circuit protection device 106 in one or more tiers. In this example embodiment, ports 132 of are bidirectional input/output (I/O) ports. I/O ports 132 are coupled to communication bus 502. Communication bus 502 may be any suitable wired or wireless communication bus. Circuit protection devices 106 communicate with each other via communication bus 502 using serial communication, parallel communication, and/or any suitable communication protocol.

Each of the second, third, and fourth circuit protection devices 116, 302, and 304 periodically transmits, via ports 132, a first message (also referred to as a first signal) when current flowing through its trip unit (not shown in FIG. 5) is less than a ZSI blocking threshold, and transmits a second message (also referred to as a second signal) when the measured current equals or exceeds the ZSI blocking threshold. When it is experiencing a problem and may not function properly, the second, third, or fourth circuit protection device 116, 302, or 304 does not output the first message or the second message to communication bus 502. The absence of a first or second message from the second, third, or fourth circuit protection device 116, 302, or 304 may be considered a third message (also referred to as a third signal). In other embodiments, the third message may be other than the absence of a message. For example, each of the second, third, and fourth circuit protection devices 116, 302, and 304 may provide a third message communicating what problem (if any) it is experiencing.

First circuit protection device 114 operates in response to the communications messages from second, third, and fourth circuit protection devices 116, 302, and 304 in the same manner as it responded to the first, second and third signals from second circuit protection device 116 in the example embodiments described above with respect to FIG. 1.

In the example embodiment shown in FIG. 5, circuit protection devices 106 communicate with each other directly through communication bus 502. In other embodiments, circuit protection devices 106, additionally or alternatively, communicate with a central controller (not shown) through communication bus 502. The central controller directly or indirectly controls operation of circuit protection devices 106 based, at least in part, on communications received from circuit protection devices 106. For example, the central controller may indirectly control first circuit protection device 114 by instructing first circuit protection device 114 to operate in the second mode (e.g., the restrained mode), when any of circuit protection devices 116, 302, or 304 sends the second message (indicating that it is detecting a current equal to or greater than the ZSI blocking threshold) to the central controller. Central controller may directly control a circuit protection device 106 by performing some or all of the functions that would otherwise be performed by a trip unit 118 (not shown in FIG. 5) in the circuit protection device.

A technical effect of the methods and systems described herein may include one or more of: (a) reducing nuisance trips of a circuit protection device; (b) alerting a user to a failed communication connection between circuit protection devices; and (c) providing systems configurable to reduce nuisance trips or increase responsiveness.

Exemplary embodiments of circuit protection devices, power distribution systems and methods of monitoring a power distribution system and/or a circuit protection device are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the power system as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A zone selective interlocking (ZSI) power distribution system comprising:
   a first circuit protection device configured to interrupt a current flowing through said first circuit protection device;
   a second circuit protection device downstream from said first circuit protection device, said second circuit protection device comprising:
   a trip mechanism configured to interrupt current flowing through said second circuit protection device; and
   a trip unit operatively coupled to said trip mechanism, said trip unit configured to:
   monitor current flowing through said second circuit protection device;
   output a first signal when the monitored current is less than a threshold value; and
   output a second signal when the monitored current is greater than or equal to the threshold value, wherein the first and second signals are different from each other and different than an absence of a signal; and
   a controller configured to:
   control said first circuit protection device in a first mode in response to the first signal;
   control said first circuit protection device in a second mode in response to the second signal; and
   control the first circuit protection device in a third mode in response to the absence of a signal from said second circuit protection device.

2. A ZSI power distribution system in accordance with claim 1, wherein said controller is disposed within said first circuit protection device.

3. A ZSI power distribution system in accordance with claim 1, wherein the first mode is an unrestrained operation mode and the second mode is a restrained operation mode.

4. A ZSI power distribution system in accordance with claim 3, wherein the third mode is selectable between the restrained operation mode and the unrestrained operation mode.

5. A ZSI power distribution system in accordance with claim 4, wherein said controller is further configured to provide an alert in response to the absence of a signal from said second circuit protection device.

6. A ZSI power distribution system in accordance with claim 1, wherein the threshold value is a ZSI blocking threshold less than a tripping threshold for said second circuit protection device.

7. A ZSI power distribution system in accordance with claim 1, wherein said controller is configured to determine an absence of a signal from said second circuit protection device when a determined period of time passes without receiving at least one of the first signal and the second signal.

8. A ZSI power distribution system in accordance with claim 1, further comprising:
   a third circuit protection device downstream from said first circuit protection device, said third circuit protection device configured to output the first signal when a monitored current through said third circuit protection device is less than the threshold value, and output the second signal when the monitored current through said third circuit protection device is greater than or equal to the threshold value; and
   an aggregator communicatively coupled to said first, second, and third circuit protection devices, said aggregator configured to receive the first and second signals from said second and third circuit protection devices and provide an aggregated output to said controller.

9. A ZSI power distribution system in accordance with claim 8, wherein said aggregator is configured to provide an aggregated output indicating whether the first signal, second signal, or an absence of the first and second signals has been detected.

10. A ZSI power distribution system in accordance with claim 9, wherein said aggregator is configured to:
    output the first signal to said controller when the first signal is received from both of the first and second circuit protection devices;
    output the second signal to said controller when the second signal is received from either of the first and second circuit protection devices; and
    output the third signal to said controller when the first and second signals are not received from one of the first and second circuit protection devices and the second signal is not received from the other of the first and second circuit protection devices.

11. A circuit protection device for use in a zone selective interlocking (ZSI) power distribution system, said circuit protection device comprising:
a trip mechanism configured to interrupt current flowing through said circuit protection device; and
a trip unit operatively coupled to said trip mechanism, said trip unit configured to:
monitor current flowing through said circuit protection device;
output a first signal when the monitored current is less than a threshold value; and
output a second signal when the monitored current is greater than or equal to the threshold value, wherein the first and second signals are different from each other and different than an absence of a signal; wherein the threshold value is a ZSI blocking threshold less than a tripping threshold for said circuit protection device.

12. A circuit protection device in accordance with claim 11, wherein the first signal comprises an intermittent signal repeated at a substantially constant interval while the monitored current is less than the threshold value.

13. A circuit protection device in accordance with claim 12, wherein the intermittent signal has a duration that is less than the substantially constant interval.

14. A circuit protection device in accordance with claim 11, wherein the first signal has substantially the same magnitude as the second signal, and the first signal has a different duration than the second signal.

15. A controller for use in a zone selective interlocking (ZSI) power distribution system, said controller comprising:
an output configured to be communicatively coupled to a first circuit protection device;
an input configured to be communicatively coupled to a second circuit protection device downstream from the first circuit protection device;
a memory device; and
a processor coupled to said memory device, said controller programmed to:
control the first circuit protection device in a first mode in response to detecting a first signal at said input;
control the first circuit protection device in a second mode in response to detecting a second signal at said input; and
control the first circuit protection device in a third mode in response to failing to detect the first signal or the second signal at said input within a determined period of time.

16. A controller in accordance with claim 15, wherein the first mode is an unrestrained operation mode and said second mode is a restrained operation mode.

17. A controller in accordance with claim 16, wherein the third mode is selectable between the restrained operation mode and the unrestrained operation mode.

18. A controller in accordance with claim 15, wherein said controller is further configured to provide an alert in response to failing to detect the first signal or the second signal at said input within the determined period of time.

19. A zone selective interlocking (ZSI) power distribution system comprising:
a first circuit protection device configured to interrupt a current flowing through said first circuit protection device;
a second circuit protection device downstream from said first circuit protection device, said second circuit protection device comprising:
a trip mechanism configured to interrupt current flowing through said second circuit protection device; and
a trip unit operatively coupled to said trip mechanism, said trip unit configured to:
monitor current flowing through said second circuit protection device;
output a first signal when the monitored current is less than a ZSI blocking threshold value; and
a controller communicatively coupled to said second circuit protection device, said controller configured to:
control said first circuit protection device in an unrestrained operation mode in response to detecting the first signal; and
control said first circuit protection device in a restrained operation mode in response to failing to detect the first signal.

* * * * *